United States Patent [19]
Rawson et al.

[11] Patent Number: 5,984,260
[45] Date of Patent: Nov. 16, 1999

[54] ELECTRICALLY DRIVEN ACTUATOR WITH FAILSAFE FEATURE

[75] Inventors: Michael S. Rawson, Tulsa; Doug Trott, Coweta; Charles Mark Tompkins, Tulsa, all of Okla.

[73] Assignee: Baker Hughes Incorporated, Houston, Tex.

[21] Appl. No.: 08/734,783

[22] Filed: Oct. 15, 1996

[51] Int. Cl.⁶ .................................................. F16K 31/50
[52] U.S. Cl. ........................ 251/71; 251/69; 251/129.12; 74/424.8 VA
[58] Field of Search ................................. 251/69, 70, 71, 251/129.11, 129.12, 266, 267; 74/424.8 VA

[56] References Cited

U.S. PATENT DOCUMENTS

| | | |
|---|---|---|
| 1,466,945 | 9/1923 | Bendix . |
| 1,784,094 | 12/1930 | Fletcher . |
| 2,327,980 | 8/1943 | Bryant . |
| 2,930,571 | 3/1960 | Vogl ..................................... 251/71 X |
| 3,168,841 | 2/1965 | Caldwell et al. . |
| 3,512,421 | 5/1970 | Anderson . |
| 3,518,891 | 7/1970 | Denkowski . |
| 3,640,140 | 2/1972 | Gulick et al. . |
| 3,889,924 | 6/1975 | Karpenko . |
| 3,921,264 | 11/1975 | Madonian et al. . |

(List continued on next page.)

FOREIGN PATENT DOCUMENTS

| | | |
|---|---|---|
| 0 512 139 A1 | 11/1992 | European Pat. Off. . |
| 785188 | 10/1957 | United Kingdom . |
| 1141082 | 5/1966 | United Kingdom . |
| 1186767 | 4/1970 | United Kingdom . |
| 1340570 | 4/1971 | United Kingdom . |
| 2243669 | 11/1991 | United Kingdom . |
| 2 283061 | 4/1995 | United Kingdom . |
| WO 80/00483 | 3/1980 | WIPO . |
| WO 96/04494 | 2/1996 | WIPO . |

OTHER PUBLICATIONS

Baker Oil Tools, Maintenance and Operating Instructions for Model "CSWC" Coil Spring, High Thrust Wire–Cutting Actuator, Product Family 884–64, Nov. 5, 1993, 1–12.
Otis Engineering Corporation, Guide to Otis Surface Safety Valve Actuators and Accessories, Feb. 1993, 5.
Axelson AVA, information of various hydraulic actuators, 3 pages, date unknown.
Baker Oil Tools, information on various pneumatic and hydraulic actuators, 5 pages, date unknown.
Model "SRM" Saftey Release Manual Actuator; 4 88. (Dresser); Date Unknown.

*Primary Examiner*—John Rivell
*Attorney, Agent, or Firm*—Rosenblatt & Redano, P.C.

[57] ABSTRACT

A valve actuator preferably driven by an electric motor is disclosed. The valve actuator is useful with surface safety valves and uses power input from an electric motor to position the valve in its normal position. A mechanism is provided to allow the valve to shift positions to a failsafe position upon failure of electrical power to the motor connected to the actuator. A screw drive is provided with the motor, with a latch mechanism holding a nut against rotation. The nut can advance longitudinally upon rotation of the drive to move a valve stem. Upon failure of electrical power, the latch mechanism releases the nut from a coupling in the actuator which is connected to the valve stem, and the main return springs in the actuator allow the nut to rotate with respect to the screw drive so that the valve can assume its failed position. Normal applications allow the valve to fail closed; however, the valve can be configured so that failure results in opening of the valve if the application requires it.

15 Claims, 7 Drawing Sheets

U.S. PATENT DOCUMENTS

| | | |
|---|---|---|
| 4,082,247 | 4/1978 | Dalton . |
| 4,090,589 | 5/1978 | Fitzwater . |
| 4,130,030 | 12/1978 | Stratienko . |
| 4,189,950 | 2/1980 | Killian . |
| 4,256,065 | 3/1981 | Hirt ................................ 74/424.8 VA |
| 4,273,307 | 6/1981 | Malinski et al. . |
| 4,289,038 | 9/1981 | Hore . |
| 4,323,221 | 4/1982 | Krober et al. . |
| 4,436,278 | 3/1984 | Smith ............................... 74/424.8 VA |
| 4,651,969 | 3/1987 | Dowdall . |
| 4,741,508 | 5/1988 | Fukamachi . |
| 4,749,004 | 6/1988 | Peash . |
| 4,771,643 | 9/1988 | Mott ............................... 74/424.8 VA |
| 4,920,811 | 5/1990 | Hopper . |
| 4,920,816 | 5/1990 | Inabe et al. . |
| 5,195,721 | 3/1993 | Akkerman . |
| 5,497,672 | 3/1996 | Appleford et al. . |

ELECTRICALLY DRIVEN ACTUATOR WITH FAILSAFE FEATURE

FIELD OF THE INVENTION

The field of this invention relates to valve actuators, particularly those used for surface safety valves in oil and gas operations, and more particularly to valve actuators that are electrically operated with a failsafe feature.

BACKGROUND OF THE INVENTION

In the past, surface safety valves have had valve actuators. These valve actuators have been hydraulically operated, having a failsafe feature to close the valves upon failure of hydraulic pressure to the actuator. Typical of such actuators are Baker Oil Tools Model CSWC, which is a coiled spring wire cutter typically used for failsafe shut applications during extended wireline operations. Such actuators are used for operating pressures as high as 15,000 psi, with 6000 psi controlled pressure. This actuator can also accommodate 10,000 psi controlled pressures. Other types of hydraulic actuators, having a failsafe operation, are also known. Typical of such actuators are those made by Otis under Model Nos. UDUH or WC. Axelson makes a type HC actuator. Generally, the hydraulic or pneumatic designs have incorporated a feature which, depending on the needs of the application, automatically opens or closes In an emergency situation such as the loss of motive fluid pressure.

Electrically actuated valves have not been in use in surface safety valve applications because of difficulties in providing a failsafe feature In the event of loss of electrical power. Yet, in some applications, it is more convenient for the operator to use electrically actuated surface safety valves than to use pneumatic or hydraulically operated valves. In some instances, regulations may require storage of significant quantities of hydraulic fluid in reserve in a location where space is at a premium, such as an offshore platform. In that situation, using an electric drive is more efficient. Additionally, a drive that uses an electric motor is generally simpler to install and costs less than a more complicated hydraulic system. Accordingly, one of the objects of the present invention is to provide an actuator that can be operated using an electric motor input while still providing a failsafe feature.

SUMMARY OF THE INVENTION

A valve actuator preferably driven by an electric motor is disclosed. The valve actuator is useful with surface safety valves and uses power input from an electric motor to position the valve in its normal position. A mechanism is provided to allow the valve to shift positions to a failsafe position upon failure of electrical power to the motor connected to the actuator. A screw drive is provided with the motor, with a latch mechanism holding a nut against rotation. The nut can advance longitudinally upon rotation of the drive to move a valve stem. Upon failure of electrical power, the latch mechanism releases the nut from a coupling in the actuator which is connected to the valve stem, and the main return springs in the actuator allow the nut to rotate with respect to the screw drive so that the valve can assume its failed position. Normal applications allow the valve to fail closed; however, the valve can be configured so that failure results in opening of the valve if the application requires it.

DETAILED DESCRIPTION OF THE PREFERRED EMBODIMENT

Figure 1A:
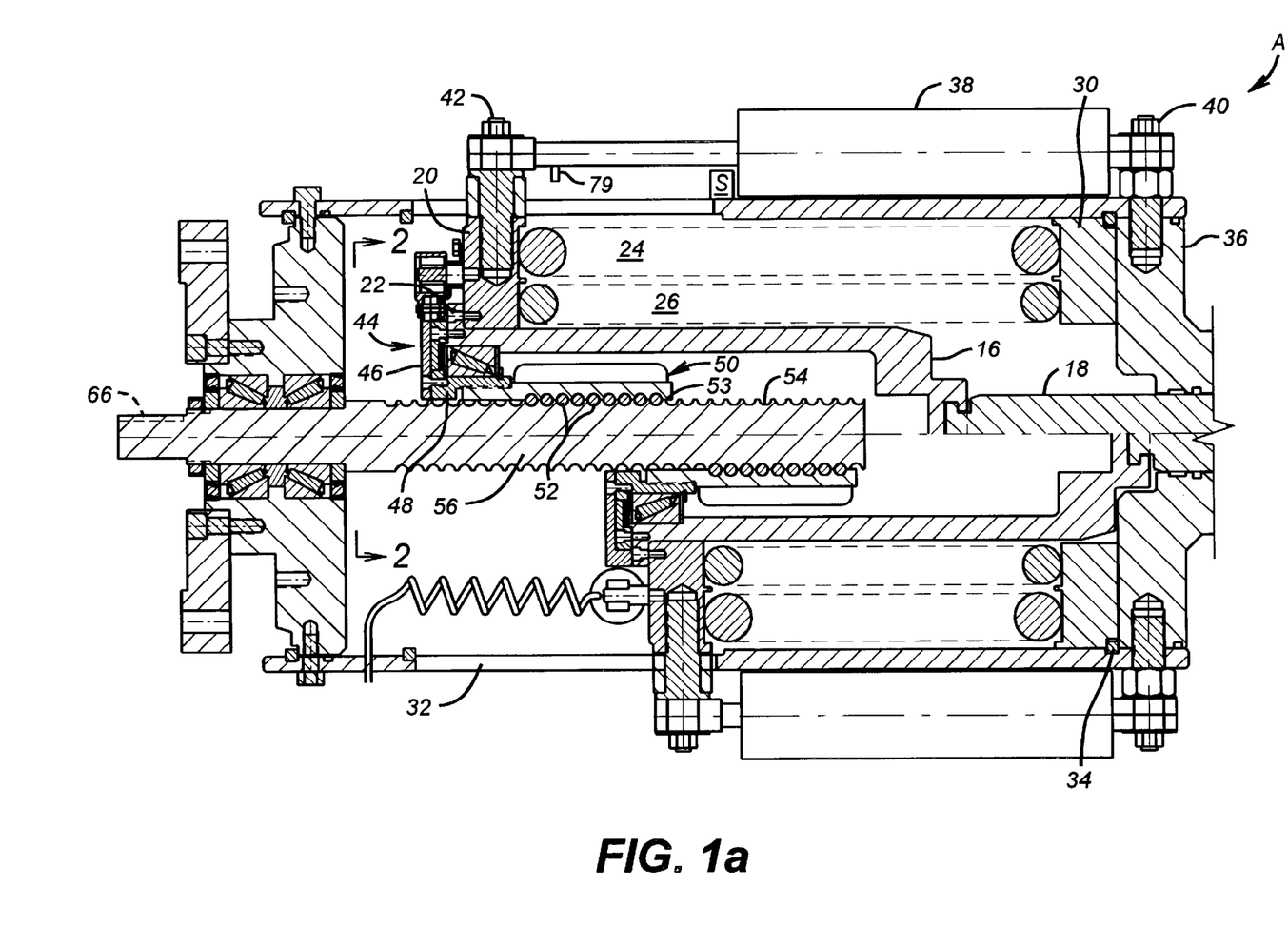
FIGS. 1a and 1b are a sectional elevational split view showing the valve and actuator in an open and closed position.
Figure 1B:
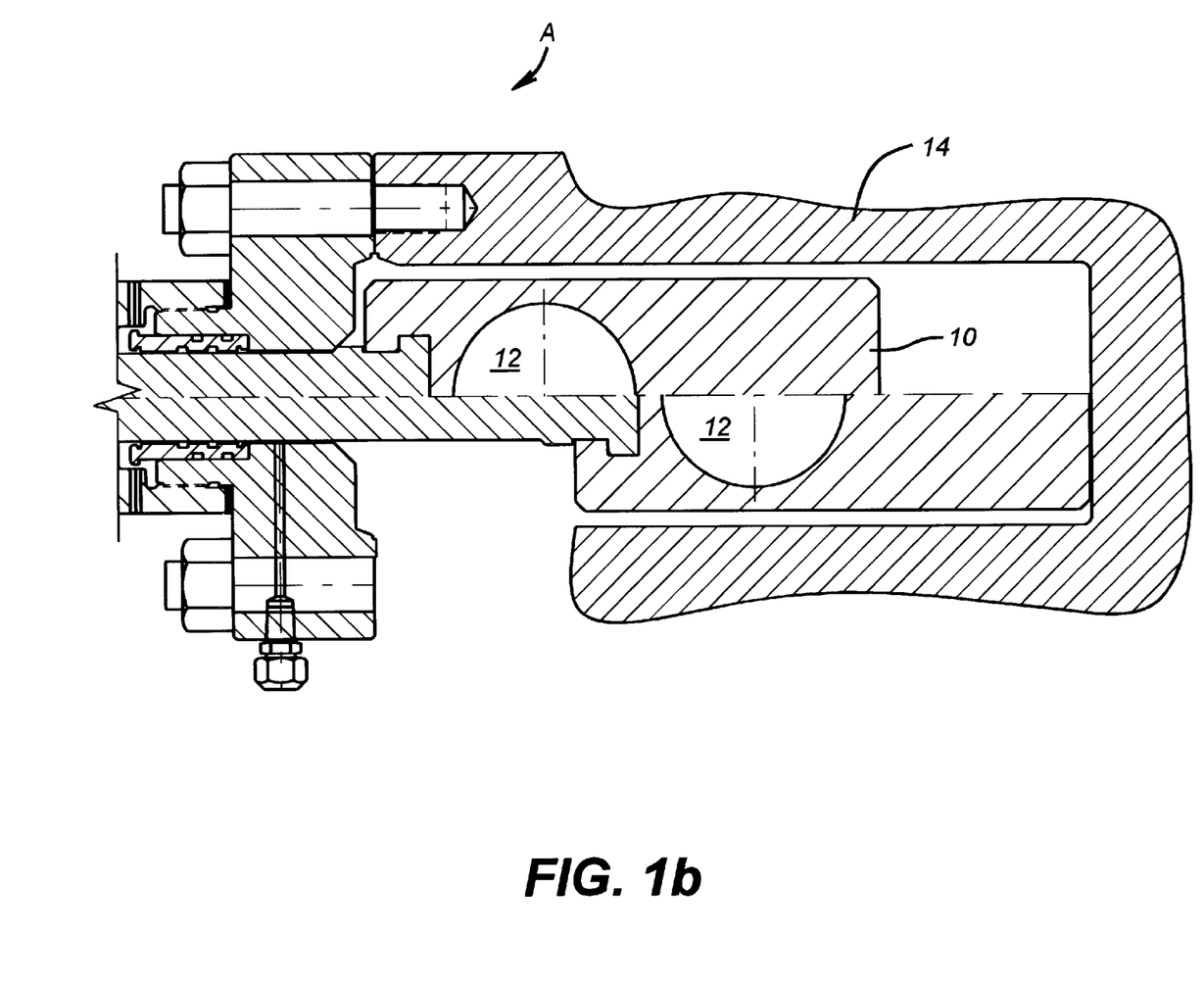

The apparatus A of the present invention is shown in FIGS. 1a and 1b in split view. A valve gate 10 has an opening 12 which, when aligned with the passageway (not shown) through the valve having a body 14, puts the valve in an open position. Thus, the lowermost position of opening 12 represents the valve body 14 in the open position, while the uppermost view of opening 12 represents the valve body 14 in the closed position. The components of the actuator include a coupling in the shape of a sleeve 16, which is engaged to the valve stem 18. A plate 20 is secured to sleeve 16 at its upper end by a fastener 22. Springs 24 and 26 are mounted concentrically and bear on plate 20 at one end and on ring 30 on the other end. Ring 30 is held to housing 32 by snap ring 34. End plate 36 further secures ring 30 and provides support for dampener 38, which is secured at one end by a bolt 40, connected to the cylinder portion of dampener 38, and a bolt 42, connected to plate 20. As a result, the dampener 38 dampens the movement of valve stem 18 when the actuator A of the present invention is operated.

Figure 2:
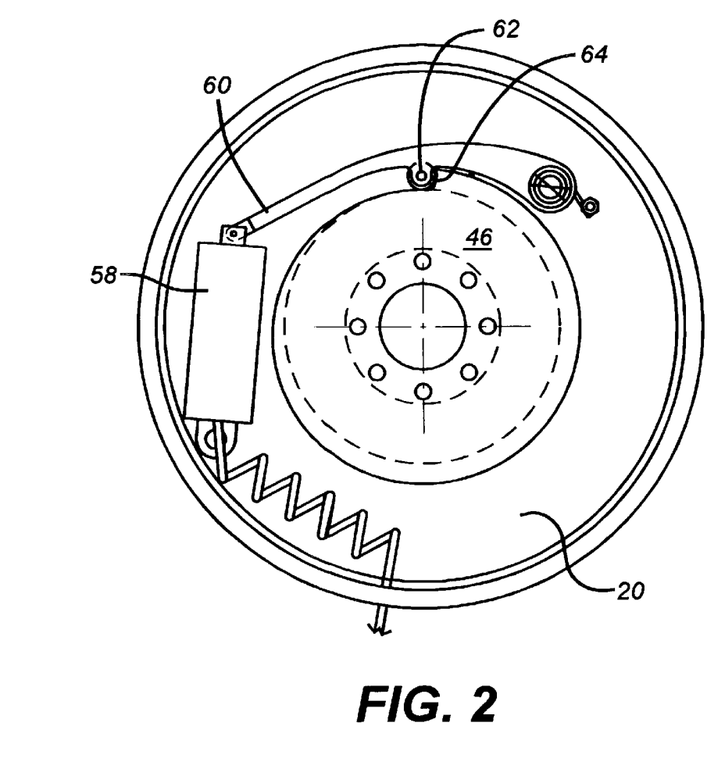
FIG. 2 is a section view along lines 2—2 of FIG. 1a, showing the latch in the engaged position.

Selectively secured to plate 20 is nut assembly 44, which consists of a top plate 46 (see FIG. 2). Attached to the top plate 46 is a sleeve 48. Connected to sleeve 48 is sleeve 50. Connected internally to sleeve 50 are one or more balls 52 which recirculate in a spiral path 53 and which engage a thread 54 on shaft 56. Such a component can be obtained from the Thompson Saginaw Company of Saginaw, Mich., as part No. 5707516. Solenoid 58 (see FIG. 2) holds latching lever 60 in position where tab 62 engages a detent or shoulder 64 on top plate 46. Thus, in the position of FIG. 2, with solenoid 58 energized, top plate 46 cannot rotate with respect to said sleeve.

Figure 4:
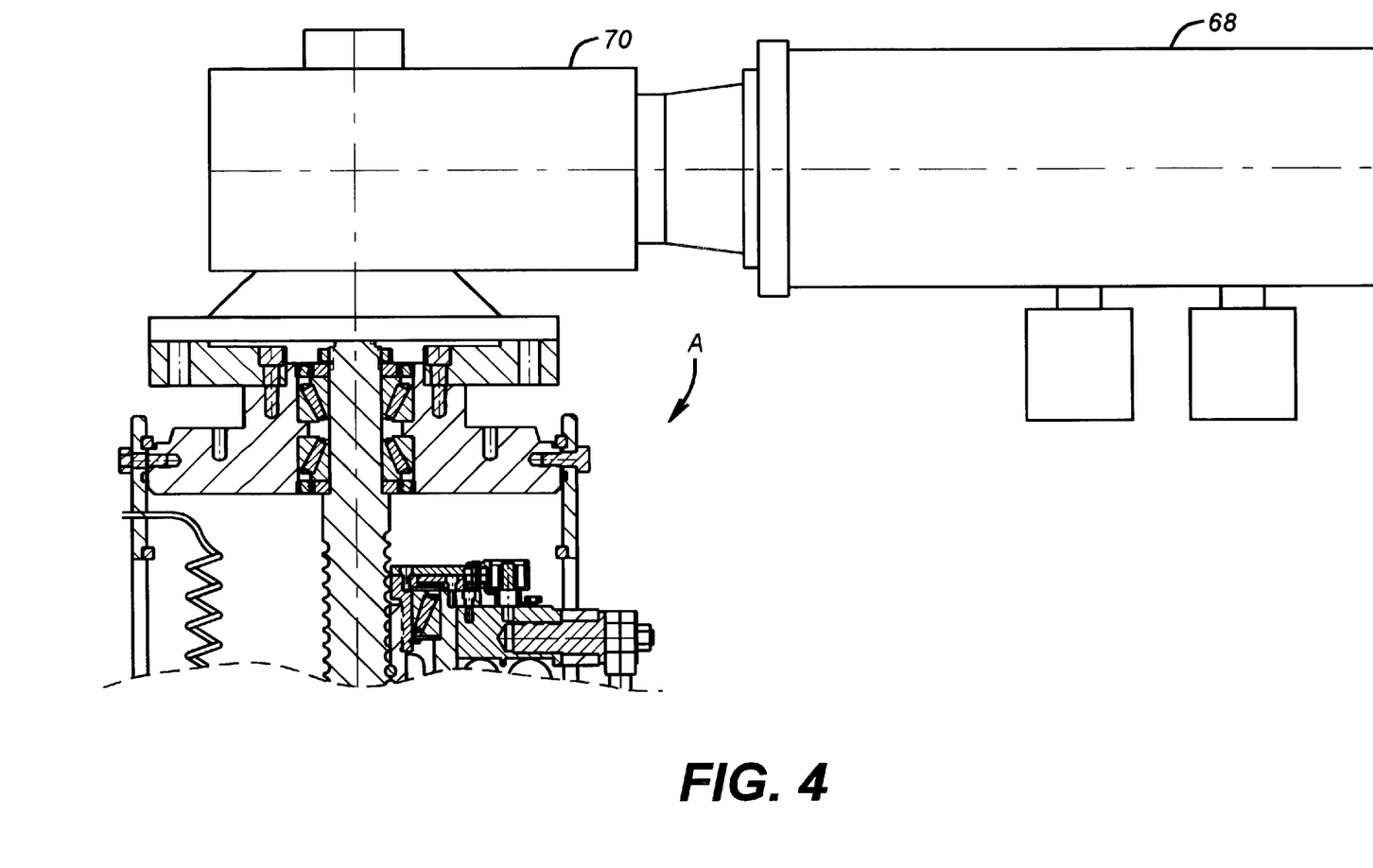
FIGS. 4–7 show alternative configurations of motor drives for the actuator depicted in FIGS. 1a and 1b.
Figure 5:
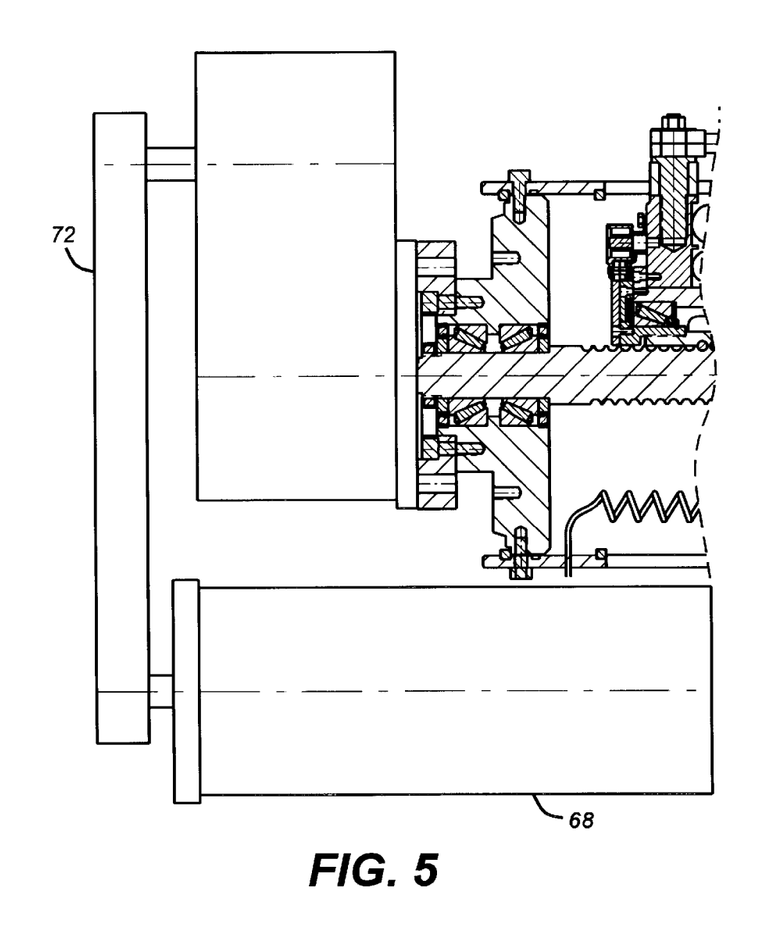
Figure 6:
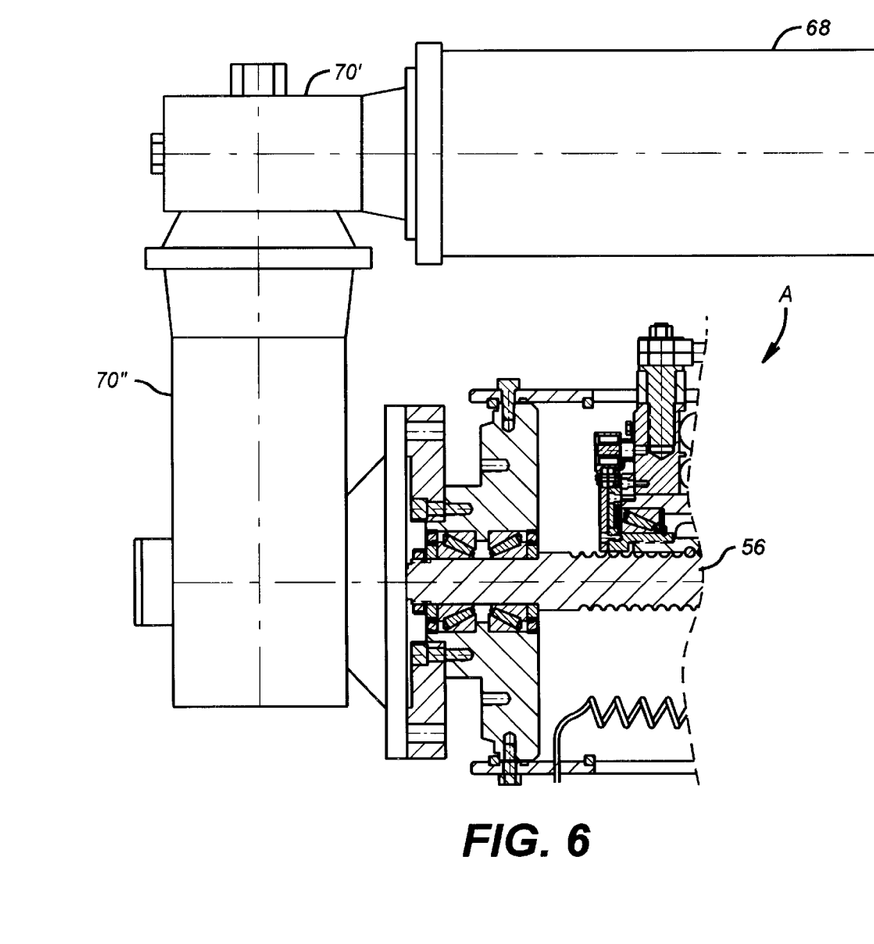
Figure 7:
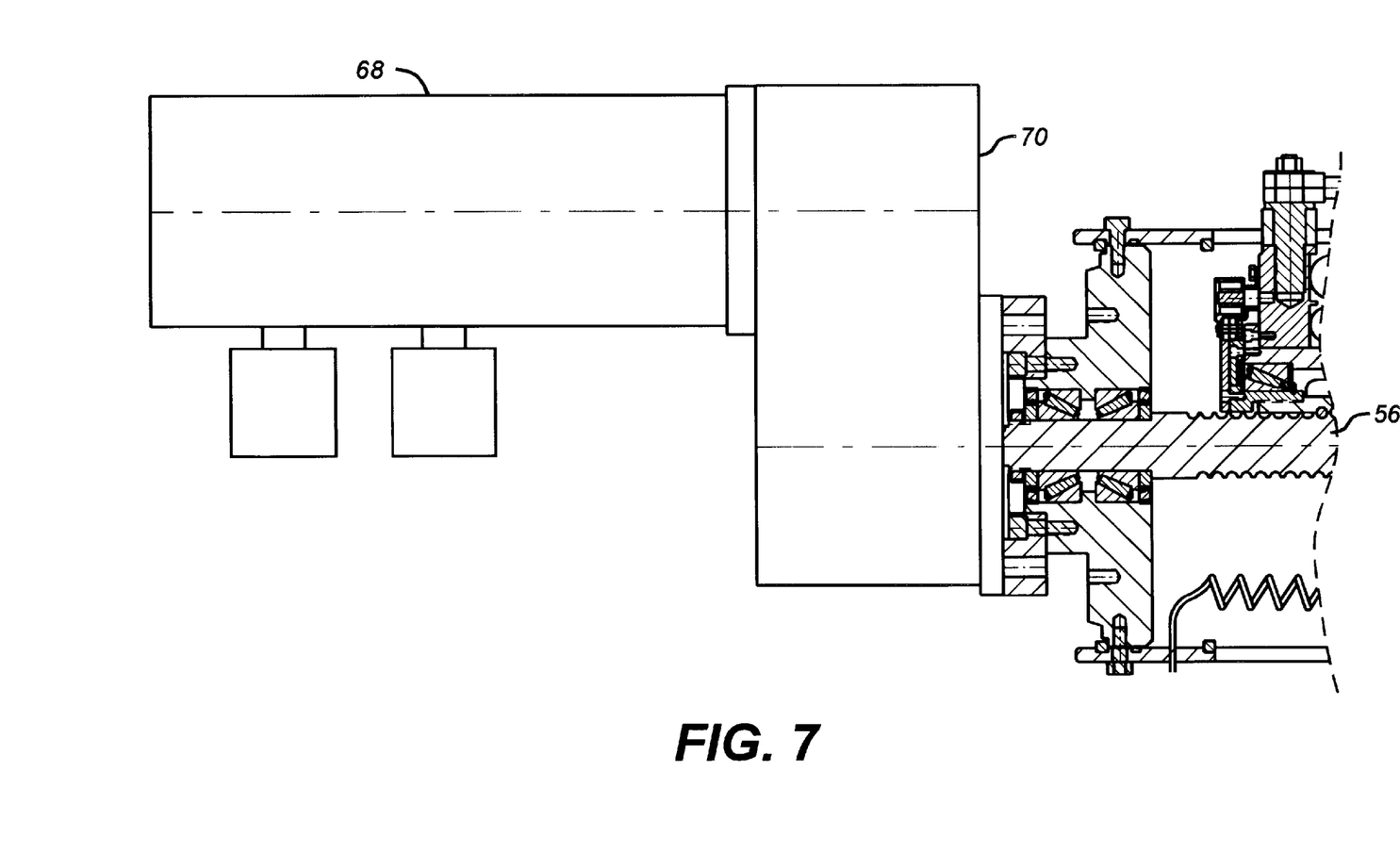

A motor assembly, shown in FIGS. 4–7, is connectible ultimately to shaft 56 at keyway 66. A typical installation is shown in FIG. 4 where motor 68 is connected to gear reducer 70. Motor 68 can be a 2-horsepower motor, and reducer 70 can have a ratio of approximately 150:1 reduction. Motor 68 can also have a manual input feature to manually turn its shaft, if necessary. FIG. 5 illustrates an installation similar to FIG. 4 except there is a belt or chain drive 72. The drive 72 can also be used to affect the ultimate driven speed of shaft 56. FIG. 6 illustrates a motor 68, with gear reducers 70' and 70". Reducer 70' has approximately a 30:1 reduction, while the reducer 70" has approximately a 5:1 reduction, making an overall reduction between the motor 68 and the shaft 56 of approximately 150:1. In the application of FIG. 6, the horsepower of the motor 68 is preferably 3. FIG. 7 is yet another variation of FIGS. 5 and 6, showing the motor 68 with a slightly different configuration on the gear reducer 70, while at the same time achieving the same overall reduction between the motor 68 and the shaft 56.

Figure 3:
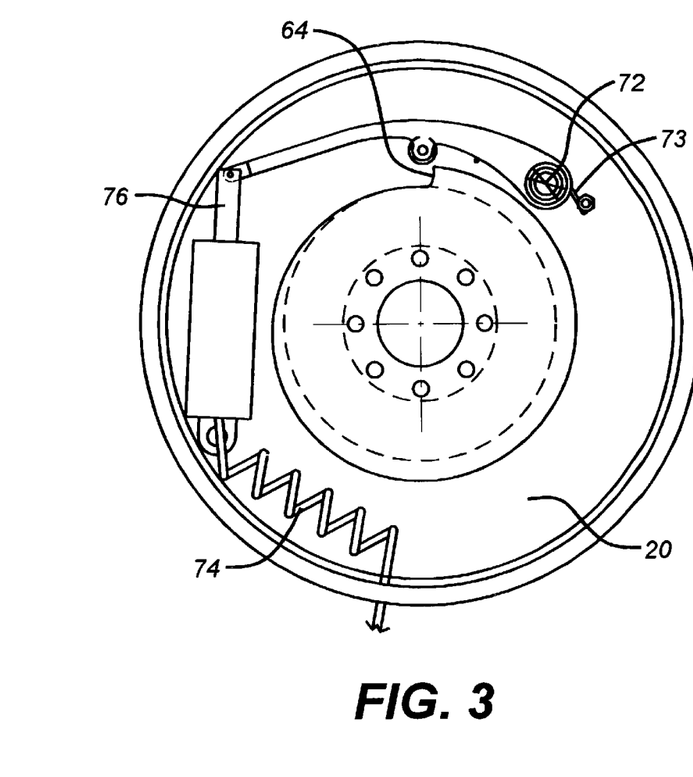
FIG. 3 is the view of FIG. 2 with the latch disengaged on a power failure.

Referring back to FIG. 2, the latching lever 60 pivots around pin 72 so that when the lever 60 goes to the position of FIG. 3 upon failure of electrical power delivered through cord 74, the solenoid 58 releases the piston 76, which is biased outwardly through a coiled spring 73 wound around pin 72 to disengage tab 62 from the path of detent or shoulder 64.

The key components of the actuator of the apparatus A having been described, its operation will now be reviewed in more detail. In order to position the opening 12 in the valve body 14 in the open position, which is illustrated by its lowermost location in FIG. 1b, electric power is applied to motor 68, which in turn transmits a rotational force through drive 70 to shaft 56 at keyway 66. With power available, the solenoid 58 retains the latching lever 60 in the position shown in FIG. 2. Accordingly, the top plate 46, along with sleeves 48 and 50, which are attached to it, cannot rotate with respect to sleeve 16 so long as tab 62 engages shoulder 64. Since a rotational input is provided from motor 68 through shaft 56, and shaft 56 has a thread 54 which is engaged to ball or balls 52 on sleeve 50, rotation of shaft 56 advances the nut assembly 44 downwardly, as shown by comparing the two split view in FIG. 1a. This occurs because the nut assembly 44 cannot rotate, and therefore, in response to a rotational force applied to shaft 56, a translation of nut assembly 44 occurs. This brings plate 20 closer to ring 30, since nut assembly 44 bears down on plate 20, compressing springs 24 and 26. When plate 20 moves down, sleeve 16 pushes the valve stem 18 downwardly to align the opening 12 in gate 10 with the opening (not shown) in the valve body 14 to put the valve in the open position.

For the particular valve illustrated in FIGS. 1a and 1b, the normal position is open. The motor 68 can be automatically cut off when the limits of travel of valve stem 18 are reached. A limit switch, shown schematically as S in FIG. 1a, can be used to cut off the motor 68 at the conclusion of the stroke of stem 18 in a known manner. A tab 79 can be attached to shaft 78, as schematically illustrated in FIG. 1a, so that contact with the limit switch S cuts off the power to the motor 68. Other known techniques for cutting off the motor power can be employed without departing from the spirit of the invention. At this point the valve is in its normal position, which is open.

Upon a power failure, the solenoid 58 is de-energized, thus allowing a coiled spring around pin 72 to turn latch lever 60. When the latch lever 60 rotates about pin 72, the nut assembly 44 is no longer restrained against relative rotation with respect to plate 20. Thus, with the force of springs 24 and 26 applied to plate 20, a longitudinal force is imparted to the nut assembly 44. Since at this time the nut assembly 44 is no longer restrained against rotation, the springs 24 and 26 advance plate 20 upwardly, while the nut assembly 44 translates by virtue of rotation around the stationary shaft 56. The shaft 56 is stationary because in the emergency power outage situation, the motor 68 retains its last position. In fact, in the past, electrically driven actuators have not been used where a failsafe operation is required because the drive motor retains its last position in the event of a power outage.

Accordingly, those skilled in the art can see that what has been disclosed is a valve actuator which can position the valve for normal operations using an electric motor as the driver, while at the same time providing a failsafe feature in the event of a power outage to the motor. Different configurations of actuators can be provided without departing from the spirit of the invention. Thus, the valve can be a normally open or closed configuration and can, consequently one that fails open or closed upon a power failure.

Thus, for applications where, for practical reasons or reasons of government regulation, it is not convenient or practical to use pneumatic or hydraulic actuation for the actuators of surface safety valves or subsurface safety valves, an application of the apparatus A provides the ability for normal operation with electrical power and a failsafe operation in the event of loss of such power.

The foregoing disclosure and description of the invention are illustrative and explanatory thereof, and various changes in the size, shape and materials, as well as in the details of the illustrated construction, may be made without departing from the spirit of the invention.

We claim:

1. An actuator for a valve having a valve stem, comprising:

a housing;

a coupling movably mounted in said housing and adapted to be connected to said valve stem;

an electrically powered drive assembly for selective actuation of said coupling in a first direction;

a return mechanism in said housing operably connected to said coupling to selectively move said coupling in a second direction opposite said first direction;

said drive assembly further comprising a mechanical latch mechanism to selectively engage said drive assembly to said coupling;

a threaded shaft;

a nut mounted to said threaded shaft, said latch mechanism selectively retaining said nut rotationally with respect to said coupling;

whereupon with said nut retained by said coupling against rotation, said coupling is translated in response to a rotation of said shaft which translates said nut.

2. The actuator of claim 1, wherein:

said latch mechanism is electrically actuated.

3. An actuator for a valve having a valve stem, comprising:

a housing;

a coupling in said housing movably mounted therein and adapted to be connected to said valve stem;

an actuating shaft rotatably mounted to said housing and selectively engageable to said coupling to drive said coupling in a first direction;

a biasing member in said housing acting on said coupling to move it in a second direction opposite said first direction when said actuating shaft is selectively disengaged from said coupling;

a nut mounted to a thread on said actuating shaft, said nut selectively rotationally secured to said coupling;

said coupling further comprises a mechanical latch to selectively secure said nut against relative rotation with respect to said coupling:

whereupon when said latch is mechanically engaged, rotation of said actuating shaft translates said coupling against said biasing member due to translation of said nut, and when said latch is mechanically released, said biasing member translates said coupling as said nut rotates with respect to said shaft.

4. The actuator of claim 3, wherein:

said coupling further comprises a latch to selectively secure said nut against relative rotation with respect to said coupling:

whereupon when said latch is engaged, rotation of said actuating shaft translates said coupling against said biasing member due to translation of said nut, and when said latch is released, said biasing member translates said coupling as said nut rotates with respect to said shaft.

5. The actuator of claim 3, wherein:

said nut also rotates with respect to said coupling, with said latch disengaged and said biasing member translating said coupling.

6. The actuator of claim 5, wherein:
said latch is electrically actuated.

7. The actuator of claim 6, wherein:
said latch retains said nut against rotation with respect to said coupling by virtue of a solenoid which, when de-energized, allows said latch to be biased in order to allow relative rotation between said nut and said coupling.

8. A surface safety valve, comprising:
a valve body having a gate attached to a stem;
a valve actuator further comprising:
   a housing;
   a coupling in said housing movably mounted therein and adapted to be connected to said valve stem;
   an actuating shaft rotatably mounted to said housing and selectively engageable to said coupling to drive said coupling in a first direction.

9. The valve of claim 8, wherein:
said coupling further comprises a latch to selectively secure said nut against relative rotation with respect to said coupling:
   whereupon when said latch is engaged, rotation of said actuating shaft translates said coupling against said biasing member due to translation of said nut, and when said latch is released, said biasing member translates said coupling as said nut rotates with respect to said shaft.

10. An actuator for a valve having a valve stem, comprising:
a housing;
a coupling movably mounted in said housing and adapted to be connected to said valve stem;
an electrically powered drive assembly for selective actuation of said coupling in a first direction;
a return mechanism in said housing operably connected to said coupling to selectively move said coupling in a second direction opposite said first direction;
said drive assembly further comprising a latch mechanism to selectively engage said drive assembly to said coupling, said latch mechanism comprises a lever and is electrically actuated by a solenoid;
a threaded shaft;
a nut mounted to said threaded shaft, said latch mechanism selectively retaining said nut rotationally with respect to said coupling;
whereupon with said nut retained by said coupling against rotation, said coupling is translated in response to a rotation of said shaft which translates said nut;
said solenoid, upon loss of power, allows said lever mounted to said coupling to be biased, whereupon a tab on said lever disengages from a stop on said nut.

11. The actuator of claim 2, wherein:
said return mechanism comprises at least one spring, said spring translating said coupling in said second direction as said nut becomes free to rotate about said shaft due to an electrical power outage to said solenoid.

12. The actuator of claim 11, further comprising:
an electric motor as a part of said drive assembly;
a speed reducer connecting said motor and said threaded shaft.

13. The actuator of claim 11, wherein:
said nut is engaged to said threaded shaft by at least one ball movably mounted in said nut and extending into contact with a thread forming said threaded shaft.

14. An actuator for a valve having a valve stem, comprising:
a housing;
a coupling in said housing movably mounted therein and adapted to be connected to said valve stem;
an actuating shaft rotatably mounted to said housing and selectively engageable to said coupling to drive said coupling in a first direction;
a biasing member in said housing acting on said coupling to move it in a second direction opposite said first direction when said actuating shaft is selectively disengaged from said coupling;
a nut mounted to a thread on said actuating shaft, said nut selectively rotationally secured to said coupling;
said coupling further comprises a latch to selectively secure said nut against relative rotation with respect to said coupling;
whereupon when said latch is engaged, rotation of said actuating shaft translates said coupling against said biasing member due to translation of said nut, and when said latch is released, said biasing member translates said coupling as said nut rotates with respect to said shaft;
said nut also rotates with respect to said coupling, with said latch disengaged and said biasing member translating said coupling;
said latch is electrically actuated;
said latch retains said nut against rotation with respect to said coupling by virtue of a solenoid which, when de-energized, allows said latch to be biased in order to allow relative rotation between said nut and said coupling;
said latch is pivotally mounted to said coupling with a coiled spring rotating a tab out of engagement with a detent on said nut when said solenoid is de-energized.

15. The actuator of claim 14, wherein:
said shaft is driven by an electric motor.

* * * * *